US008458232B1

(12) United States Patent
Spertus et al.

(10) Patent No.: US 8,458,232 B1
(45) Date of Patent: Jun. 4, 2013

(54) SYSTEMS AND METHODS FOR IDENTIFYING DATA FILES BASED ON COMMUNITY DATA

(75) Inventors: Michael Spertus, Wilmette, IL (US); Kenneth Berryman, San Mateo, CA (US)

(73) Assignee: Symantec Corporation, Mountain View, CA (US)

( * ) Notice: Subject to any disclaimer, the term of this patent is extended or adjusted under 35 U.S.C. 154(b) by 310 days.

(21) Appl. No.: 12/415,587

(22) Filed: Mar. 31, 2009

(51) Int. Cl.
*G06F 17/30* (2006.01)
(52) U.S. Cl.
USPC .............................. 707/812; 707/831
(58) Field of Classification Search
USPC .................. 707/999.102, 812, 831
See application file for complete search history.

(56) References Cited

U.S. PATENT DOCUMENTS

| | | | |
|---|---|---|---|
| 7,664,754 B2 * | 2/2010 | Shipp | 726/24 |
| 2003/0028896 A1 * | 2/2003 | Swart et al. | 725/127 |
| 2005/0080807 A1 * | 4/2005 | Beilinson et al. | 707/102 |
| 2005/0240819 A1 * | 10/2005 | Bennett et al. | 714/34 |
| 2007/0073689 A1 * | 3/2007 | Chandra | 707/6 |
| 2008/0172445 A1 * | 7/2008 | Zaidelson et al. | 709/201 |
| 2008/0189249 A1 * | 8/2008 | Petakov et al. | 707/3 |
| 2008/0243979 A1 * | 10/2008 | Cherkauer et al. | 708/303 |
| 2009/0094210 A1 * | 4/2009 | Reinhardt et al. | 707/3 |
| 2010/0154026 A1 * | 6/2010 | Chatterjee et al. | 726/1 |

* cited by examiner

*Primary Examiner* — Charles Kim
*Assistant Examiner* — Grace Park
(74) *Attorney, Agent, or Firm* — ALG Intellectual Property, LLC (57) ABSTRACT

Computer-implemented methods, systems, and computer-readable media for using community data to automatically generate rules for distinguishing data files from other file types are disclosed. In one example, an exemplary method for performing such a task may comprise: 1) receiving file metadata from a plurality of computing systems within a community, 2) establishing, based on the file metadata received from the plurality of computing systems within the community, criteria for distinguishing data files from other file types, and then 3) automatically generating a rule that comprises at least one of the criteria for distinguishing data files from other file types. Corresponding methods for identifying data files by applying such rules are also disclosed.

15 Claims, 6 Drawing Sheets

SYSTEMS AND METHODS FOR IDENTIFYING DATA FILES BASED ON COMMUNITY DATA

BACKGROUND

Many software applications, such as ALTIRIS' SOFTWARE VIRTUALIZATION SOLUTION (SVS), SYMANTEC's ENDPOINT PROTECTION, and ADVANCED CONCEPT's eDRM product, need to be able to distinguish between data files (i.e., files that contain information used as input, and/or written as output, by an application or system, such as .doc files for WORD) from other file types, such as configuration files, temporary files, directory files, or the like. For example, virtualization solutions (such as ALTIRIS' SVS) typically store configuration files for virtualized applications (such as configuration files for a virtualized version of WORD) within a virtualization layer on a computing system, while storing data files created by such virtualized applications (such as .doc files created by the virtualized version of WORD) outside of this virtualization layer.

In the past, applications typically distinguished data files from other file types by applying various manually-created rule sets tailored for specific file types, applications, and file locations. In addition to requiring a significant amount of time and energy to create, such manually-created rules may produce incomplete or inaccurate results. For example, a rule that specifies that all files that are stored in a user's "My Documents" folder should be treated as data files may fail to identify many other data files stored in different locations on the user's computing device.

SUMMARY

The instant disclosure generally relates to systems and methods for using community data to automatically generate rules for distinguishing data files from other file types. As will be described in greater detail below, an exemplary method for performing such a task may comprise: 1) receiving file metadata from a plurality of computing systems within a community (such as an enterprise, consumer base, or portions or combinations of the same), 2) establishing, based on the file metadata received from the community, criteria for distinguishing data files from other file types, and then 3) automatically generating a rule that contains at least one of these criteria.

The file metadata received from the community may contain a variety of information that may be helpful in determining whether a file represents a data file. Examples of file metadata include data that represents or identifies, for at least one file, the file's name, the file's pathname, the file's extension, the file's creation date, the file's last-modified date, a hash of the file, the number of times the file has been read, the number of times the file has been modified, at least one application that has accessed the file, a list of applications installed on a computing device where the file resides, and/or usage behavior for the file.

The systems disclosed herein may establish criteria for distinguishing data files from other file types in a variety of ways. For example, an exemplary system may determine, by analyzing file metadata gathered from a community, that files of a specific file extension (e.g., ".tb") are always or substantially always stored in a location known to be associated with data files (e.g., the folder "My Documents" on WINDOWS machines), suggesting that such files represent data files. In this example, the system may create a rule that: 1) contains criteria for determining whether a file ends in the file extension ".tb" and 2) specifies that files that satisfy such criteria should be treated as data files.

Similarly, the system may determine, by analyzing file metadata received from a community, that a specific file (e.g., "user_cfg.tb") is frequently or always present in a specific relative location (e.g., "C:\Documents and Settings\All Users\Application Data\TuneBlaster") on the machines of users of a specific application (e.g., "TuneBlaster") within the community, suggesting that this file represents a configuration file. In this example, the system may create a rule that: 1) contains criteria for determining whether a file is named "user_cfg.tb" and 2) specifies that files that satisfy such criteria should be treated as configuration files.

The system may also establish criteria for distinguishing data files from other file types by performing a variety of additional analyses on file metadata received from communities, including determining: 1) whether files of a specific file extension within the community are always or substantially always stored in a location known to be associated with non-data files, 2) whether the names of files of a specific file extension frequently vary within the community (e.g., whether the names of ".tb" files are commonly the same or frequently different within the community), 3) whether a specific file is widespread within the community (i.e., whether the file "mymusicfiles.tb" is present on many users' machines within the community), and/or 4) whether a file is shared by users within the community (e.g., whether the file "user_playlist.tb" has been attached to email messages sent or received by users within the community).

As detailed above, the system may create rules that contain at least one criterion for distinguishing data files from other file types. Computing systems (or applications, such as virtualization solutions, stored on such computing systems) may then use these rules to successfully and efficiently identify data files.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for using community data to automatically generate rules for distinguishing data files from other file types. As used herein, the term "data file" may refer to a computer file that stores data for use by a computer application or system (i.e., a file that contains information that is used as input, and/or written as output, by an application or system), as opposed to files that contain executable instructions or code (such as executable files) or that define the operation or structure of an application or system (such as configuration files, directory files, etc.).

Figure 1:
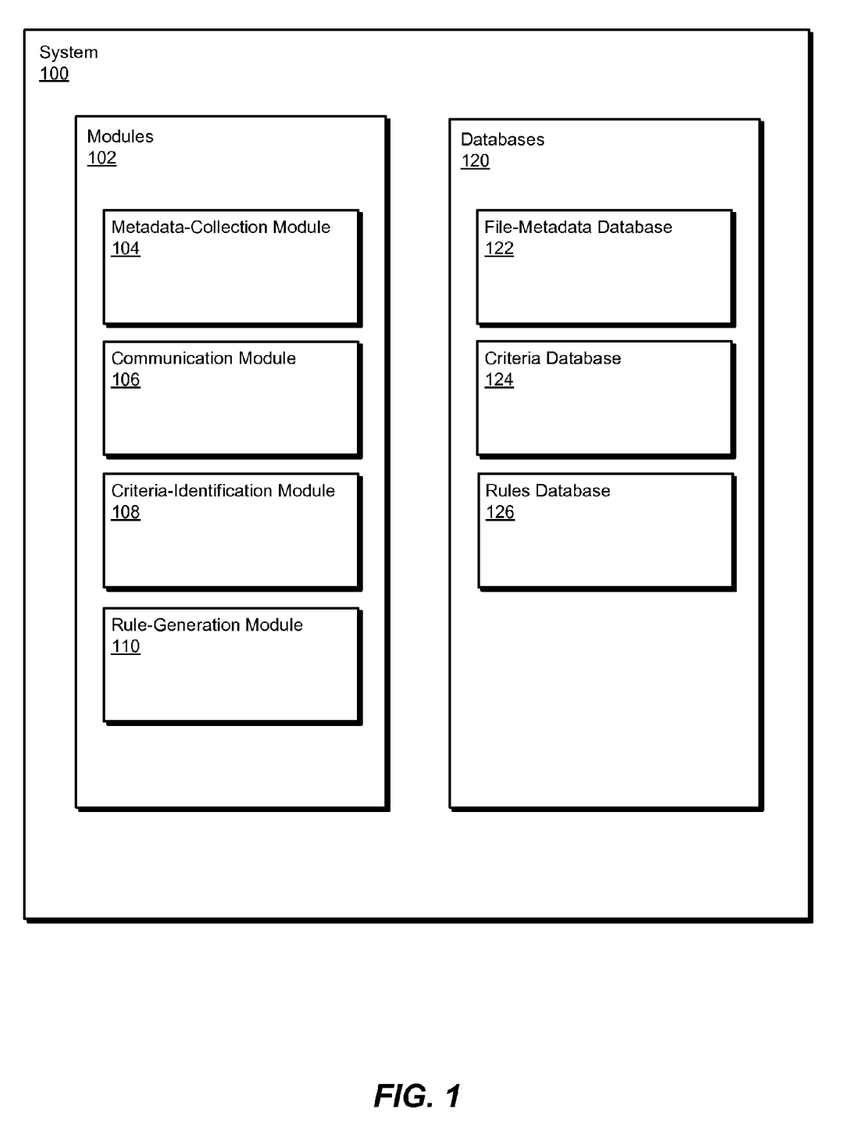
FIG. 1 is a block diagram of an exemplary system for using community data to automatically generate rules for distinguishing data files from other file types.
Figure 2:
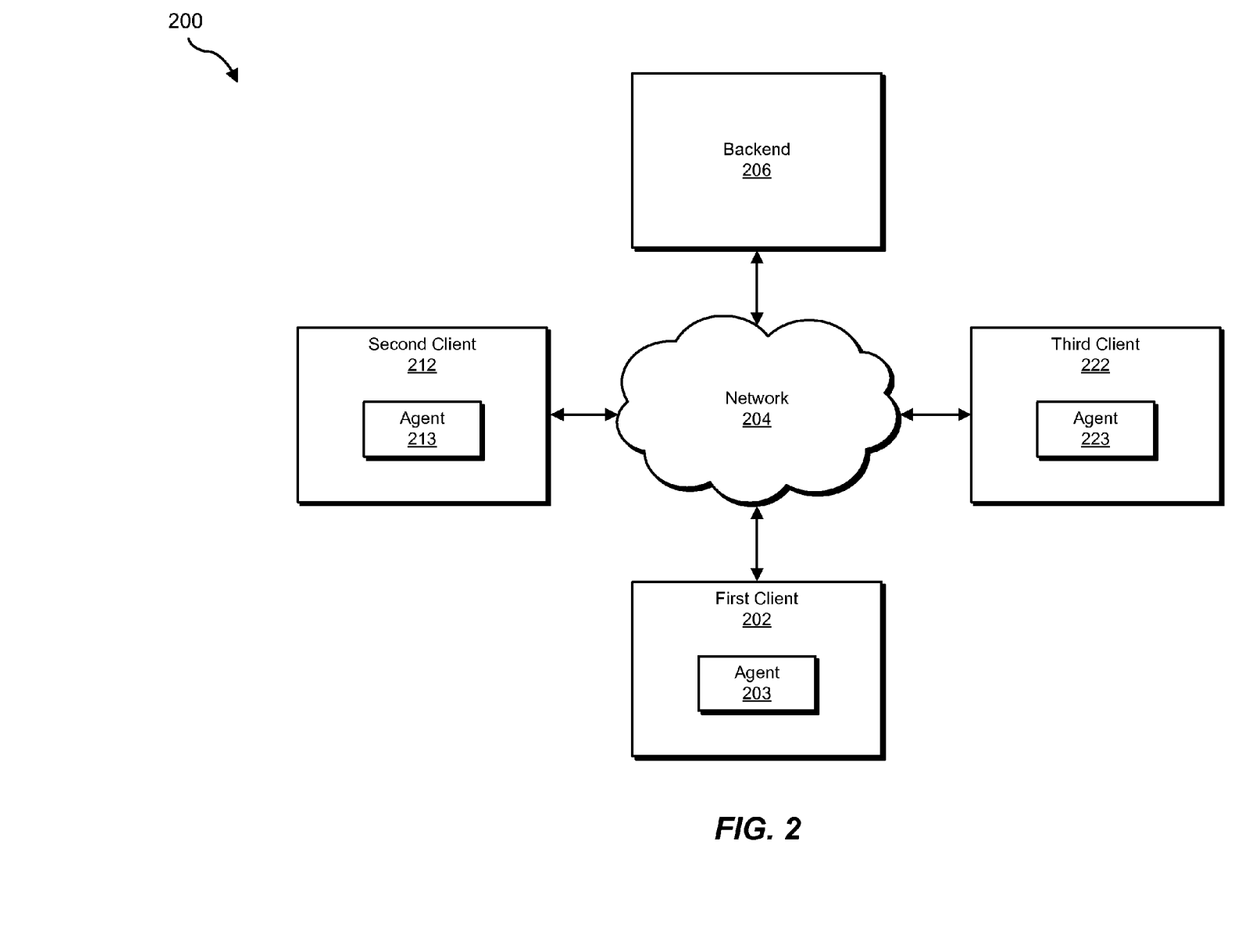
FIG. 2 is a block diagram of an exemplary system for using community data to automatically generate rules for distinguishing data files from other file types.

The following will provide, with reference to FIGS. 1-2, detailed descriptions of exemplary systems for using community data to automatically generate rules for distinguishing data files from other file types. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for using community data to automatically generate rules for distinguishing data files from other file types. As illustrated in this figure, exemplary system 100 may comprise one or more modules for performing one or more tasks. For example, and as will be explained in greater detail below, exemplary system 100 may comprise a metadata-collection module 104 programmed to identify and collect file metadata for files. Exemplary system 100 may also comprise a communication module 106 programmed to facilitate communication between various client devices in a community (e.g., clients 202, 212, and 222 in FIG. 2) with a backend (e.g., backend 206 in FIG. 2).

In addition, and as will be described in greater detail below, exemplary system 100 may comprise a criteria-identification module 108 programmed to establish, based on file metadata received from devices within a community, criteria for distinguishing data files from other file types. Examples system 100 may also comprise a rule-generation module 110 programmed to automatically generate rules that contain criteria for distinguishing data files from other file types. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., backend 206 and agents 203, 213, and 223 on first client 202, second client 212, and third client 222, respectively), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also comprise one or more databases 120. Databases 120 may represent portions of a single database or computing device or a plurality of databases or computing devices. In one embodiment, exemplary system 100 may comprise a file-metadata database 122 for storing file metadata for files, a criteria database 124 for storing criteria for distinguishing data files from other file types, and a rules database 126 for storing rules that contain such criteria.

Databases 120 in FIG. 1 may represent a portion of one or more computing devices. For example, databases 120 may represent a portion of backend 206 in FIG. 2, computing system 510 in FIG. 5, and/or portions of exemplary network architecture 600 in FIG. 6. Alternatively, databases 120 in FIG. 1 may represent one or more physically separate devices capable of being accessed by a computing device, such as backend 206 in FIG. 2, computing system 510 in FIG. 5, and/or portions of exemplary network architecture 600 in FIG. 6.

FIG. 2 is a block diagram of an exemplary system 200 for using community data to automatically generate rules for distinguishing data files from other file types. As illustrated in this figure, exemplary system 200 may comprise a plurality of clients 202, 212, and 222 in communication with a backend 206 via a network 204.

Clients 202, 212, and 222 may represent computing systems within one or more communities, such as an enterprise, consumer base, or portions or combinations of the same. In one embodiment, and as will be described in greater detail below, clients 202, 212, and 222 may be programmed to send file metadata to backend 206. For example, agents 203, 213, and 223 (which may comprise one or more of modules 102 in FIG. 1) on clients 202, 212, and 222, respectively, may: 1) identify a file on its respective client, 2) access file metadata associated with the file, and then 3) transmit this file metadata to backend 206.

Upon receiving this file metadata, backend 206 may be programmed to: 1) establish, based on this file metadata, criteria for distinguishing data files from other file types and then 2) automatically generate a rule that comprises at least one of the criteria for distinguishing data files from other file types, as will be described in greater detail below. In some examples, backend 206 may store such file metadata, criteria, and rules in file-metadata database 122, criteria database 124, and rules database 126, respectively.

Clients 202, 212, and 222 generally represent any type or form of computing device capable of reading computer-executable instructions. Examples of clients 202, 212, and 222 include, without limitation, laptops, desktops, servers, cellular phones, personal digital assistants (PDAs), multimedia players, embedded systems, combinations of one or more of the same, exemplary computing system 510 in FIG. 5, and any other suitable computing device. In addition, agents 203, 213, and 223 may represent a portion of a software application (such as a virtualization application) installed on clients 202, 212, and 222. Agents 203, 213, and 223 may also represent a separate standalone application installed on clients 202, 212, and 222.

Backend 206 generally represents any type or form of computing device that is capable of generating, based on file metadata received from devices within a community, rules that contain criteria for distinguishing data files from other file types. Examples of backend 206 include, without limitation, servers and databases configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., GSN Network), exemplary network architecture 600 in FIG. 6, or the like. Network 204 may facilitate communication or data transfer using wireless or wired connections. In one embodiment, network 204 may facilitate communication between clients 202, 212, and 222 and backend 206.

Figure 3:
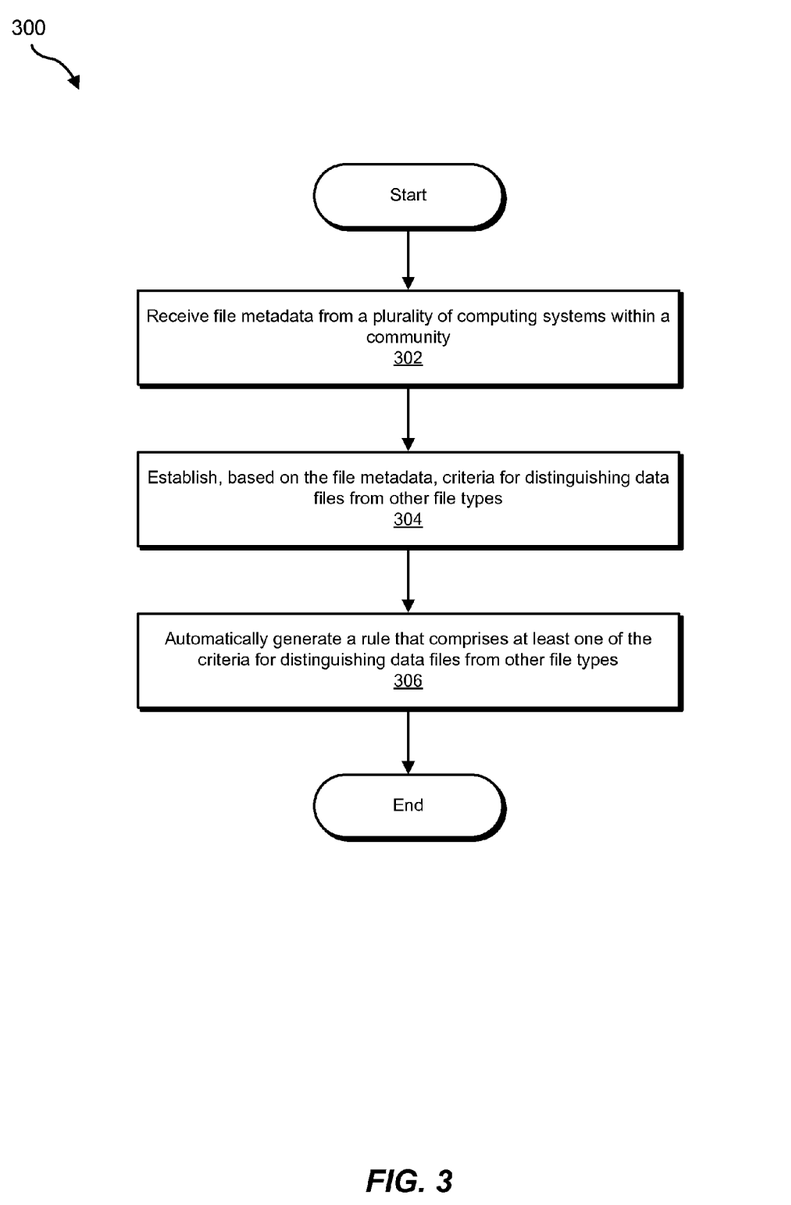
FIG. 3 is a flow diagram of an exemplary method for using community data to automatically generate rules for distinguishing data files from other file types.

FIG. 3 is a flow diagram of an exemplary computer-implemented method 300 for using community data to automatically generate rules for identifying data files. As illustrated in this figure, at step 302 the system may receive file metadata from a plurality of computing systems within a community. For example, backend 206 in FIG. 2 (which may, as detailed above, comprise communication module 106 in FIG. 1) may receive file metadata for a plurality of files from first client 202, second client 212, and third client 222 via network 204.

As detailed above, clients 202, 212, and 222 may represent all or a portion of a single community or a plurality of communities. For example, clients 202, 212, and 222 may represent computing devices within a single or a plurality of consumer bases, a single or a plurality of enterprises, or portions or combinations of one or more of the same.

The phrase "file metadata" generally refers to any type or form of information concerning a file that may be used to determine whether the file is a data file. Examples of file metadata include information that represents or identifies, for at least one file, the file's name, the file's pathname or relative location within a local file system (e.g., "C:\Documents and Settings\All Users \My Documents"), the file's extension (e.g., .doc), the file's creation date, the file's last-modified date, a hash or digital signature for the file, the number of times the file has been read or modified, applications that have accessed the file, a list of applications installed on a computing device where the file resides, usage behavior for the file (such as whether the application was received, or has been transmitted, as an attachment to an email), or any other information that may be useful in determining whether the file represents a data file.

At step 304, the system may establish, based on the file metadata received in step 302, criteria for distinguishing data files from other file types. For example, backend 206 in FIG. 2 (which may, as detailed above, comprise criteria-identification module 108 in FIG. 1) may, by analyzing the file metadata received from first client 202, second client 212, and third client 222 in step 302, establish criteria for distinguishing data files from other file types.

For example, backend 206 may, by analyzing file metadata received from numerous computing devices within a community, determine that files of a specific file extension (e.g., ".tb") are always or substantially always stored in a location known to be associated with data files (e.g., the folder "My Documents" on WINDOWS machines), suggesting that such files represent data files. In this example, the system may establish criteria for determining whether a file ends in the file extension ".tb."

Similarly, backend 206 may, by analyzing file metadata received from numerous computing devices within a community, that a specific file (e.g., "user_cfg.tbf") is frequently or always present in a specific relative location (e.g., "C:\Documents and Settings\All Users\Application Data\TuneBlaster") on the machines of users of a specific application (e.g., "TuneBlaster") within the community, suggesting that this file represents a configuration file. In this example, the system may establish criteria for determining whether a file is named "user_cfg.tbf."

Backend 206 may also establish criteria for distinguishing data files from other file types by performing a variety of additional analyses on file metadata received from a community, including by: 1) determining whether files of a specific file extension within the community are always or substantially always stored in a location known to be associated with non-data files (e.g., a location known to be associated with configuration or temporary files), 2) determining whether the names of files of a specific file extension frequently vary within the community (e.g., whether ".tb" files in the community commonly have the same file name), 3) determining whether a file having a specific filename is frequently or always present on the machines of users of a specific application within the community (e.g., whether the machines of users of the application "TuneBlaster" always or frequently possess a copy of the file "user_cfg.tbf"), 4) determining whether a file having a specific file name is widespread within the community (i.e., whether the file "mymusicfiles.tb" is unique or present on many users' machines within the community), 5) determining whether a file is shared by users within the community (e.g., whether the file "user_playlist.tb" has been attached to email messages sent or received by users within the community), and/or 6) by performing any other analysis that may be used to determine whether a file represents a data file.

Examples of criteria that may be established based on such analyses include, without limitation, criteria for determining whether a file ends with a specific file extension, criteria for determining whether a file is stored in a specific location, criteria for determining whether a file has a specific file name, criteria for determining whether a hash or digital signature of a file matches a specific file hash, or any other useful criteria.

At step 306, the system may automatically generate a rule that comprises at least one of the criteria established in step 304. For example, backend 206 in FIG. 2 (which may, as detailed above, comprise rule-generation module 110 in FIG. 1) may automatically generate a rule that: 1) contains one or more of the criteria established in step 304 and 2) specifies whether files that satisfy such criteria represent data files. Upon completion of step 306, exemplary method 300 in FIG. 3 may terminate.

As detailed above, rules may contain one or more criteria for distinguishing data files from other file types. For example, a rule may contain both: 1) first criteria for determining whether a file ends with a specific file extension (e.g., ".tbf") and 2) criteria for determining whether a file is stored in a specific location (e.g., "C:\Documents and Settings\All Users\Application Data\TuneBlaster"). In this example, the rule may specify that files that satisfy both of these criteria represent non-data (e.g., configuration) files.

In one example, the system may assign various weight values to one or more of the criteria contained in a rule. For example, the system may assign a low-weight value (e.g., 2, on a scale of 1 to 10) to criteria used to determine whether a file is stored in a specific location. Alternatively, the system may assign a high-weight value (e.g., 8, a scale of 1 to 10) to criteria used to determine whether a file ends with a specific file extension. In one example, the system may, by comparing the various characteristics of a file with their respective weight values, determine whether a file represents a data file.

Although not illustrated in FIG. 3, in some examples exemplary method 300 may also comprise, upon generating the rule in step 306, providing the rule to at least one of the computing systems within the community. For example, backend 206 in FIG. 2 may transmit the rule generated in step 306 to first client 202, second client 212, and/or third client 222. In an additional example, the rule may represent a portion of agents 203, agent 213, and agent 223 stored on first client 202, second client 212, and third client 222, respectively. As detailed above, agents 203, 213, and 223 may represent a portion of a software application (such as a virtualization application) installed on clients 202, 212, and 222 and/or a separate standalone application installed on clients 202, 212, and 222.

Figure 4:
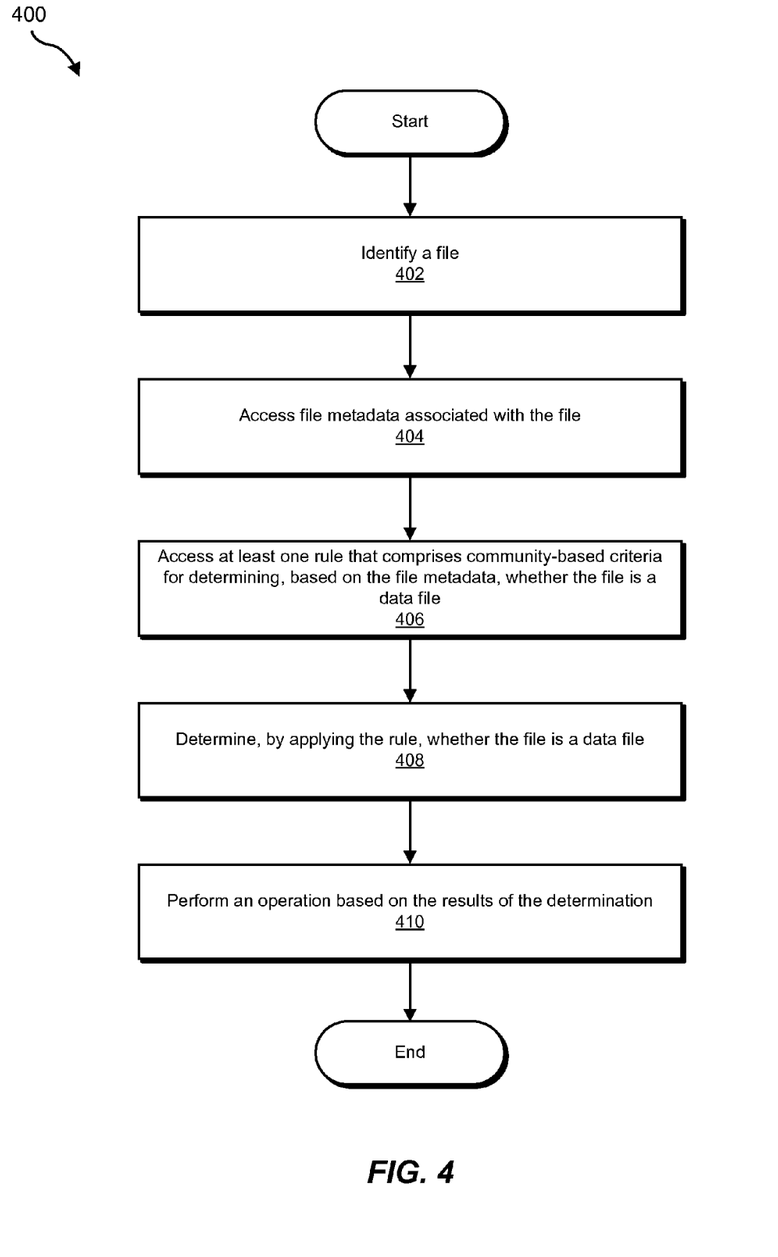
FIG. 4 is a flow diagram of an exemplary method for identifying data files.

As detailed above, the rules created by the systems and methods disclosed herein may be used by endpoint machines to identify data files. FIG. 4 is a block diagram of an exemplary computer-implemented method 400 for identifying data files. As illustrated in this figure, at step 402 the system may identify a file. For example, agent 203 on first client 202 in FIG. 2 (which may, as detailed above, represent a standalone application or a portion of an existing application) may identify a file stored or loaded onto first client 202.

At step 404, the system may access file metadata associated with the file identified in step 402. For example, agent 203 on first client 202 in FIG. 2 (which may, as detailed above, comprise metadata-collection module 104 in FIG. 1) may access file metadata associated with the file identified in step 402.

The system may access file metadata associated with files in a variety of ways. In one example, the system may identify and access file metadata stored within the file itself (e.g., within the header of a file). In another example, the system may identify and access file metadata stored outside of the file (e.g., within the local file system where the file is stored). The system may also use any number of algorithms or heuristics to generate file metadata for a file.

At step 406, the system may access a rule that comprises criteria for determining, based on the file meta-metadata accessed in step 404, whether the file identified in step 402 is a data file. For example, agent 203 on first client 202 in FIG. 2 may access a rule that contains criteria for determining whether the file identified in step 402 is a data file.

As detailed above, rules may be stored in local and/or remote storage devices. For example, agent 203 in FIG. 2 may retrieve a rule from a local storage device on first client 202, a remote source device, and/or backend 206 (each of which may, as detailed above, comprise rules database 126 in FIG. 1).

As detailed above, the rule accessed in step 406 may contain criteria that were established based on file metadata received from a plurality of computing systems within a community. Examples of such criteria may include, without limitation, criteria for determining whether a file ends with a specific file extension (e.g., ".tb"), criteria for determining whether a file is stored in a specific location (e.g., "C:\Documents and Settings\All Users\Application Data\TuneBlaster"), criteria for determining whether a file has a specific file name (e.g., "user_cfg.tbf"), criteria for determining whether a hash or digital signature of a file matches a specific file hash, or any other useful criteria. The rule may also contain a weight value assigned to at least one of the criteria, as detailed above.

At step 408, the system may determine, by applying the rule accessed in step 406 to the file identified in step 402, whether the file is a data file. For example, agent 203 on first client 202 in FIG. 2 may determine that the file "myplaylist.tb" represents a data file by applying a rule that: 1) contains criteria for determining whether a file ends in the file extension ".tb" and 2) specifies that files that satisfy such criteria should be treated as data files.

At step 410, the system may perform an operation based on the results of the determination made in step 408. For example, agent 203 on first client 202 in FIG. 2 (which may, as detailed above, represent a standalone application or a portion of an existing application, such as a virtualization application) may cause first client 202 to perform an operation based on whether the file identified in step 402 is a data file.

For example, if agent 203 represents a portion of a virtualization application, then agent 203 may store the file "myplaylist.tb" within a local file system on first client 202, as opposed to storing the file within a virtualization layer on first client 202, if agent 203 determines that the file represents a data file. Similarly, if agent 203 determines that the file "user_cfg.tbf" represents a configuration file for a virtualized application, then agent 203 may store the configuration file within a virtualization layer on first client 202. Agent 203 may also determine whether to perform a security operation on a file (such as a malware scan) based on whether the file represents a data file.

By automatically generating and applying rules that contain criteria for distinguishing data files from other file types, the systems and methods disclosed herein may enable developers of software applications to efficiently and accurately distinguish data files from other file types. As such, the systems and methods disclosed herein may obviate the need to manually create rules for identifying data files, potentially resulting in substantial savings.

Figure 5:
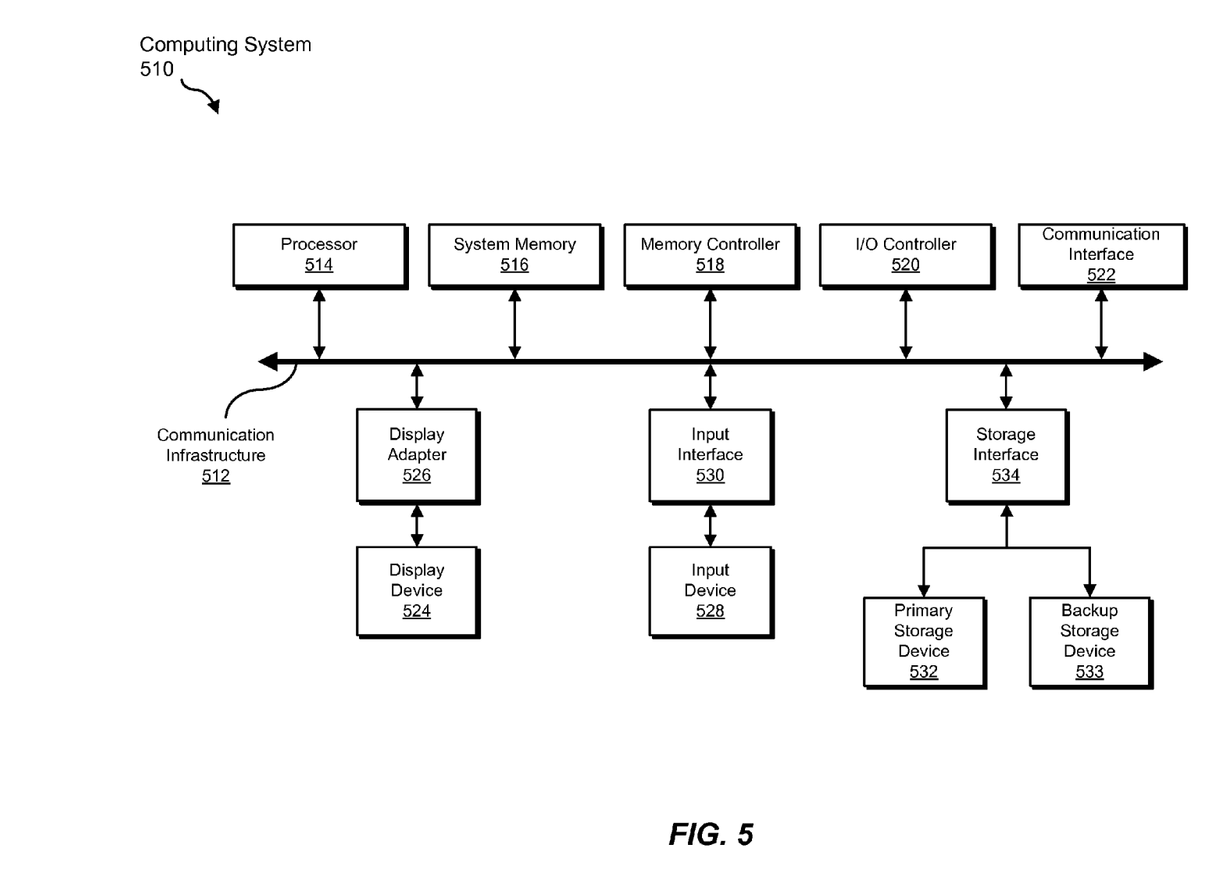
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the receiving, establishing, generating, determining, providing, identifying, accessing, applying, performing, retrieving, and storing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below).

In certain embodiments, exemplary computing system 510 may also comprise one or more components or elements in addition to processor 514 and system memory 516. For example, as illustrated in FIG. 5, computing system 510 may comprise a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as receiving, establishing, generating, determining, providing, identifying, accessing, applying, performing, retrieving, and storing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the receiving, establishing, generating, determining, providing, identifying, accessing, applying, performing, retrieving, and storing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 594 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the receiving, establishing, generating, determining, providing, identifying, accessing, applying, performing, retrieving, and storing steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the receiving, establishing, generating, determining, providing, identifying, accessing, applying, performing, retrieving, and storing steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the receiving, establishing, generating, determining, providing, identifying, accessing, applying, performing, retrieving, and storing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
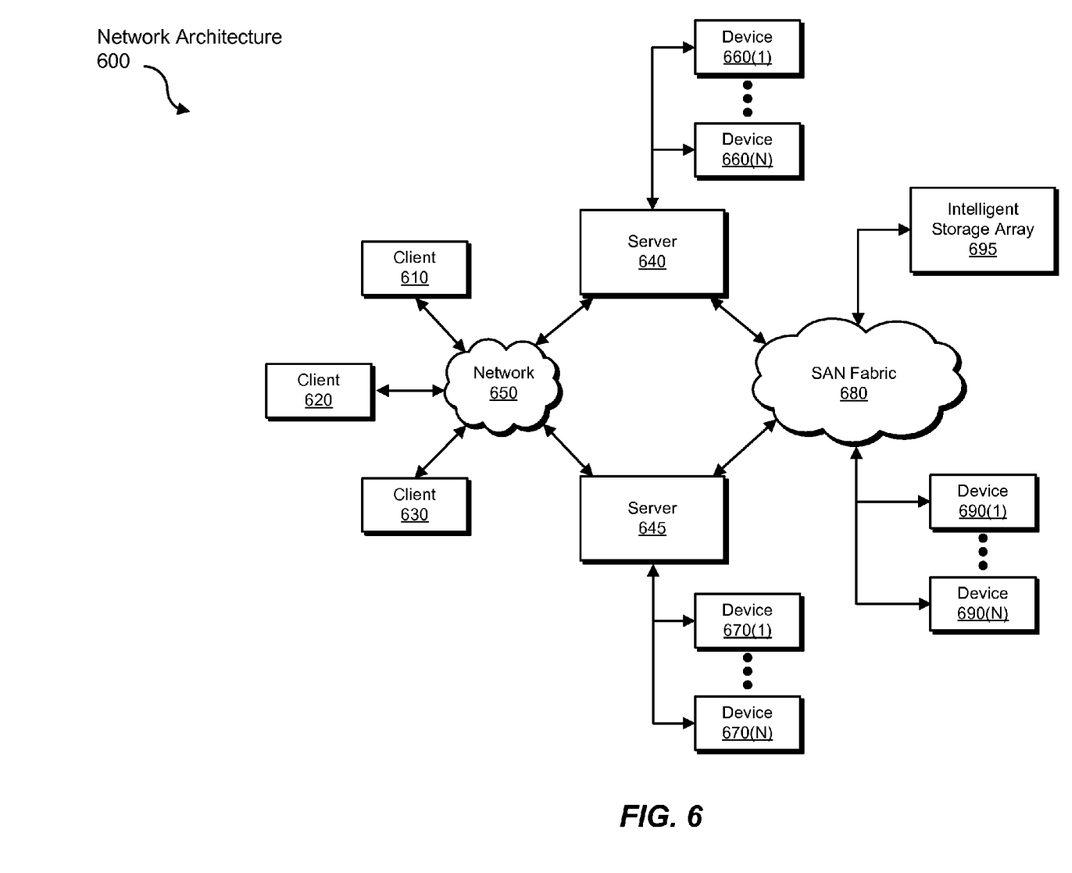
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the receiving, establishing, generating, determining, providing, identifying, accessing, applying, performing, retrieving, and storing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for using community data to automatically generate rules for identifying data files. Such a method may comprise: 1) receiving file metadata from a plurality of computing systems within a community, 2) establishing, based on the file metadata received from the plurality of computing systems within the community, criteria for distinguishing data files from other file types, and then 3) automatically generating a rule that comprises at least one of the criteria for distinguishing data files from other file types.

The system may establish the criteria for distinguishing data files from other file types in a variety of ways. For example, the system may determine whether files of a specific file extension within the community are substantially always stored in a location known to be associated with data files, determine whether files of a specific file extension within the community are substantially always stored in a location known to be associated with non-data files, determine whether file names of files of a specific file extension frequently vary within the community, determine whether a file having a specific file name is frequently or always present on computing devices of users of a specific application within the community, determine whether a file having a specific file name is frequently or always present in a specific relative location on computing devices of users of a specific application within the community, determine whether a file having a specific file name is widespread within the community, and/or determine whether a file is shared by users within the community.

Examples of file metadata include data that identifies, for at least one file, the file's name, the file's pathname, the file's extension, the file's creation date, the file's last-modified date, a hash of the file, the number of times the file has been read, the number of times the file has been modified, at least one application that has accessed the file, a list of applications installed on a computing device where the file resides, and/or usage behavior for the file. The community may represent at least one enterprise, at least one consumer base, and/or portions or combinations of the same.

In one example, the method may further comprise assigning weight values to at least one of the criteria. In addition, the method may also comprise providing the rule to at least one of the plurality of computing systems within the community.

Computing system 510 and/or one or more components of network architecture 600 may also perform and/or be a means for performing, either alone or in combination with other elements, one or more steps of an exemplary method for identifying data files. This exemplary method may comprise: 1) identifying a file, 2) accessing file metadata associated with the file, 3) accessing a rule that comprises criteria for determining, based on the file metadata, whether the file is a data file, the criteria being established based on file metadata received from a plurality of computing systems within a community, 4) determining, by applying the rule, whether the file is a data file, and then 5) performing an operation based on results of the determination.

Accessing the file metadata associated with the file may comprise accessing file metadata stored within the file and/or accessing file metadata stored outside of the file. In addition, accessing the rule that comprises the criteria for determining whether the file is a data file may comprise retrieving the rule from a local storage device and/or retrieving the rule from a remote storage device.

Performing the operation may comprise storing the file in a virtualization layer on the computing system, storing the file outside of the virtualization layer on the computing system, performing a security operation, or any other operation that may be dependent on whether a file is a data file.

Examples of criteria that may be used to distinguish data files from other file types include criteria for determining whether the file is of a specific file extension, criteria for determining whether the file is stored in a specific location, criteria for determining whether the file has a specific file name, and criteria for determining whether a hash of the file matches a specific file hash. In one example, the rule may contain a weight value assigned to at least one of the criteria.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for using community data to automatically generate rules for identifying files that are suitable for being stored within virtualization layers, at least a portion of the method being performed by a server comprising at least one processor, the method comprising:

receiving file metadata from a plurality of client devices within a community, wherein the file metadata identifies characteristics of files stored on the plurality of client devices;

automatically determining, by analyzing the file metadata received from the plurality of client devices within the community, that a file having a specific file name is
frequently present on client devices of users of a specific
application within the community;
concluding, based at least in part on the determination, that
the file represents a non-data file suitable for being
stored within virtualization layers;
automatically generating a rule that:
comprises criteria for identifying the file;
specifies that the file is suitable for being stored within
virtualization layers;
providing the rule to at least one of the plurality of client
devices within the community to enable the client device
to determine that the file is suitable for being stored
within a virtualization layer on the client device.

2. The method of claim 1, further comprising at least one of:
determining that the file is substantially always stored in a
location known to be associated with non-data files;
identifying a file extension of the file and determining that
file names of files of the file extension do not frequently
vary within the community;
determining that the file is frequently present in a specific
relative location on client devices of users of the specific
application within the community;
determining that the file is widespread within the community;
determining that the file is not shared by users within the
community.

3. The method of claim 2, further comprising assigning
weight values to at least one of the determinations.

4. The method of claim 1, wherein the file metadata comprises data that identifies, for at least one file, at least one of:
the file's name;
the file's pathname;
the file's extension;
the file's creation date;
the file's last-modified date;
a hash of the file;
the number of times the file has been read;
the number of times the file has been modified;
at least one application that has accessed the file;
a list of applications installed on a client device where the
file resides;
usage behavior for the file.

5. A computer-implemented method for identifying files
that are suitable for being stored within virtualization layers,
at least a portion of the method being performed by a client
device comprising at least one processor, the method comprising:
identifying a file;
accessing file metadata associated with the file;
accessing a rule that:
comprises criteria for identifying the file based on the
file metadata associated with the file;
specifies that the file is suitable for being stored within
virtualization layers;
wherein the rule is automatically generated by determining, by analyzing file metadata that identifies characteristics of files stored on a plurality of client devices within
a community, that the file is frequently present on client
devices of users of a specific application within the
community;
determining, by applying the rule to the file metadata associated with the file, that the file is suitable for being
stored within a virtualization layer on the client device;
in response to the determination, storing the file within the
virtualization layer on the client device.

6. The method of claim 5, wherein accessing the file metadata associated with the file comprises:
accessing file metadata stored within the file;
accessing file metadata stored outside of the file.

7. The method of claim 5, wherein accessing the rule comprises:
retrieving the rule from a local storage device;
retrieving the rule from a remote storage device.

8. The method of claim 5, further comprising determining
whether to perform a security operation on the file.

9. The method of claim 5, wherein the criteria comprises at
least one of:
criteria for determining whether the file is of a specific file
extension;
criteria for determining whether the file is stored in a specific location;
criteria for determining whether the file has a specific file
name;
criteria for determining whether a hash of the file matches
a specific file hash.

10. The method of claim 9, wherein the rule contains a
weight value assigned to at least one of the criteria.

11. The method of claim 5, wherein the file metadata
received from the plurality of client devices comprises data
that identifies, for at least one file, at least one of:
the file's name;
the file's pathname;
the file's extension;
the file's creation date;
the file's last-modified date;
a hash of the file;
the number of times the file has been read;
the number of times the file has been modified;
at least one application that has accessed the file;
a list of applications installed on a client device where the
file resides;
usage behavior for the file.

12. A system for automatically generating rules for identifying files that are suitable for being stored within virtualization layers based on community data, the system comprising:
a communication module programmed to receive file metadata from a plurality of client devices within a community, wherein the file metadata identifies characteristics
of files stored on the plurality of client devices;
a criteria-identification module programmed to:
automatically determine, by analyzing the file metadata
received from the plurality of client devices within the
community, that a file having a specific file name is
frequently present on client devices of users of a specific application within the community;
conclude, based at least in part on the determination, that
the file represents a non-data file suitable for being
stored within virtualization layers;
a rule-generation module programmed to automatically
generate a rule that:
comprises criteria for identifying the file;
specifies that the file is suitable for being stored within
virtualization layers;
wherein the communication module is further programmed to provide the rule to at least one of the plurality of client devices within the community to enable
the client device to determine that the file is suitable for
being stored within a virtualization layer on the client
device;
at least one processor configured to execute at least one of
the communication module, the criteria-identification
module, and the rule-generation module.

13. The system of claim 12, wherein the criteria-identification module is further programmed to at least one of:
- determine that the file is substantially always stored in a location known to be associated with non-data files;
- identify a file extension of the file and determine that file names of files of the file extension do not frequently vary within the community;
- determine that the file is frequently present in a specific relative location on client devices of users of the specific application within the community;
- determine that the file is widespread within the community;
- determine that the file is not shared by users within the community.

14. The system of claim 13, wherein the criteria-identification module is further programmed to assign weight values to at least one of the determinations.

15. The system of claim 12, wherein the file metadata received from the plurality of client devices comprises data that identifies, for at least one file, at least one of:
- the file's name;
- the file's pathname;
- the file's extension;
- the file's creation date;
- the file's last-modified date;
- a hash of the file;
- the number of times the file has been read;
- the number of times the file has been modified;
- at least one application that has accessed the file;
- a list of applications installed on a client device where the file resides;
- usage behavior for the file.

* * * * *